(12) United States Patent
Bandyopadhyay et al.

(10) Patent No.: US 8,311,514 B2
(45) Date of Patent: Nov. 13, 2012

(54) PREVENTION OF ACCIDENTAL DEVICE ACTIVATION

(75) Inventors: Shamik Bandyopadhyay, Lake Stevens, WA (US); G. Eric Engstrom, Kirkland, WA (US); Vikram Kapoor, Redmond, WA (US); Kathryn C. Lemson, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 182 days.

(21) Appl. No.: 12/883,801

(22) Filed: Sep. 16, 2010

(65) Prior Publication Data

US 2012/0071149 A1    Mar. 22, 2012

(51) Int. Cl.
*H04M 1/66* (2006.01)
(52) U.S. Cl. .......................... 455/410; 455/566; 455/418
(58) Field of Classification Search .................. 455/410, 455/411, 566
See application file for complete search history.

(56) References Cited

U.S. PATENT DOCUMENTS

| | | | |
|---|---|---|---|
| 7,015,705 B2 * | 3/2006 | Inaba et al. | 324/678 |
| 2006/0232559 A1 | 10/2006 | Chien | |
| 2007/0176903 A1 | 8/2007 | Dahlin | |
| 2007/0273561 A1 | 11/2007 | Philipp | |
| 2008/0174570 A1 * | 7/2008 | Jobs et al. | 345/173 |
| 2008/0191905 A1 | 8/2008 | Martin | |
| 2008/0196945 A1 | 8/2008 | Konstas | |
| 2009/0033343 A1 * | 2/2009 | Reynolds et al. | 324/688 |
| 2009/0083850 A1 * | 3/2009 | Fadell et al. | 726/19 |
| 2009/0187676 A1 * | 7/2009 | Griffin et al. | 710/14 |
| 2009/0262078 A1 * | 10/2009 | Pizzi | 345/169 |
| 2010/0039214 A1 | 2/2010 | Pratt | |
| 2010/0099394 A1 * | 4/2010 | Hainzl | 455/418 |
| 2010/0102832 A1 | 4/2010 | Bartling | |

OTHER PUBLICATIONS

Van Tatenhove et al., "Using capacitive sensor user interfaces in next generation mobile and embedded consumer devices," *EE Times*, Dec. 5, 2006, 8 pages.

* cited by examiner

*Primary Examiner* — Vladimir Magloire
(74) *Attorney, Agent, or Firm* — Klarquist Sparkman, LLP

(57) ABSTRACT

The present application allows wake-up and unlock operations to occur using a single event, such as a single keystroke. Additionally, a check is made to ensure that activation was caused by human touch, not an object. In one embodiment, an area of a mobile device is designated as a wake-up area, which is separate from the touch screen. A user can touch the wake-up area to both activate the mobile device from a sleep mode and unlock the mobile device. In another embodiment, the wake-up area can be integrated into the touch screen, so that there is not an appearance of a separate button. Fingerprint checking and/or proximity sensors can also be integrated into the mobile device.

18 Claims, 10 Drawing Sheets

PREVENTION OF ACCIDENTAL DEVICE ACTIVATION

FIELD

The present application concerns activating devices, and, more particularly, preventing accidental activation of devices, such as mobile phones.

BACKGROUND

Accidental activation of devices can be problematic. In one well-known example, cell phone calls can be unknowingly made while the cell phone is in a user's pocket or handbag. One technique to prevent accidental device activation is to include a lock/unlock feature on the phone. Typically, either a sequence of keystrokes or a personal pin number are used to unlock the phone.

Low-power mode is another feature of most mobile devices, particularly for mobile devices that depend on battery power. In order to activate a mobile device (i.e., exit low-power mode), generally multiple key strokes are needed. One example of a mobile phone with a low-power mode of operation is the Apple® Iphone®. That phone has a push button (separate from the touch screen) to activate the phone, but the button can be pushed unintentionally while the phone is in a pocket or in a handbag, draining battery power. Once the phone is activated, a separate operation is needed to unlock the phone.

It is desirable to make device activation and unlocking easier, while not loosing the benefits of low-power mode.

SUMMARY

The present application allows a wake-up and unlock operation to occur using a single event, such as a single keystroke. Additionally, a check is made to ensure that activation was caused by human touch, not an object.

In one embodiment, an area of a mobile device is designated as a wake-up area, which is separate from the touch screen. A user can touch the wake-up area to both activate the mobile device from a sleep mode and unlock the mobile device in a single touch. However, a check can be made to ensure that the touch is from a human by using a voltage comparison.

In another embodiment, the wake-up area can be integrated into the touch screen, so that there is not an appearance of a separate button.

In yet another embodiment, fingerprint recognition hardware and/or proximity sensors can be used to limit activation and unlocking until satisfaction of predetermined conditions. In one example, the proximity sensor can limit input based on the environment of the mobile device.

The foregoing and other objects, features, and advantages of the invention will become more apparent from the following detailed description, which proceeds with reference to the accompanying figures.

DETAILED DESCRIPTION

Figure 1:
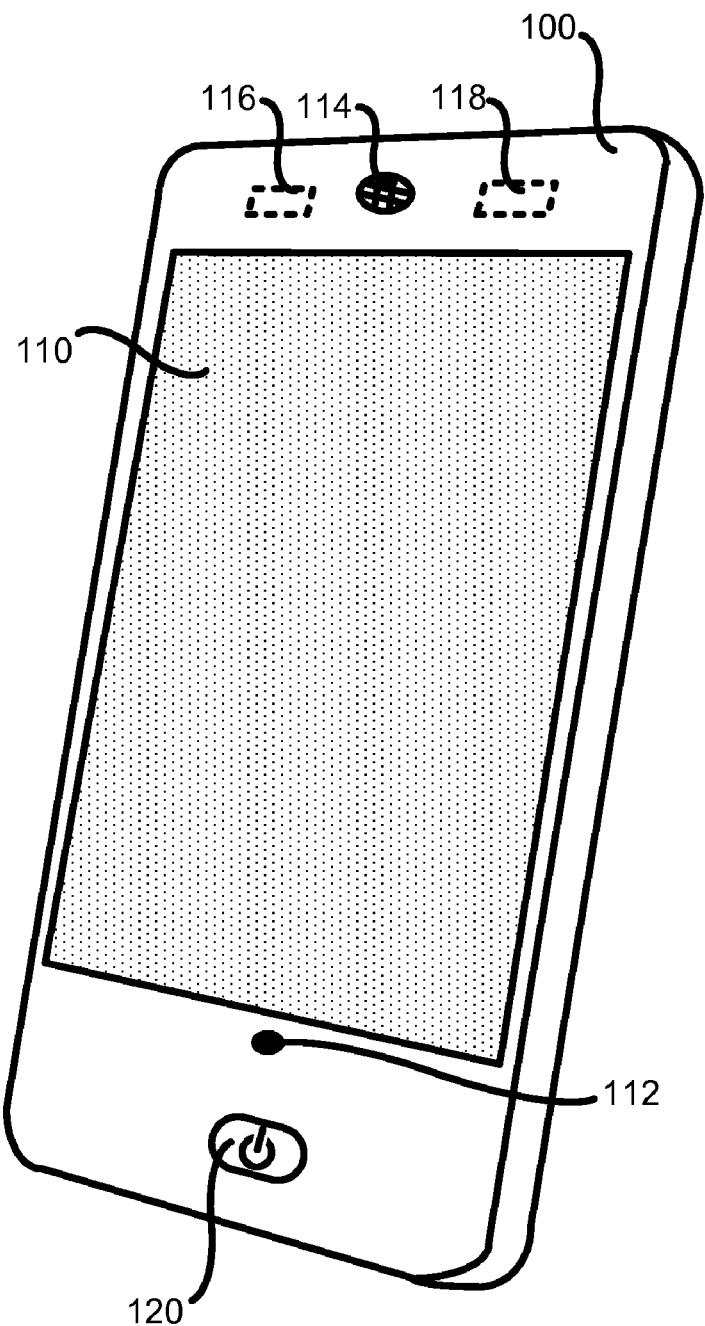
FIG. 1 is a perspective view of a mobile device with a single button for simultaneous device activation and unlocking.

FIG. 1 depicts a front view of an example mobile device 100. In this example, the mobile device is a phone. As shown, the mobile device includes a touch screen display 110, a microphone 112, and a speaker 114. Additionally, two proximity sensors 116, 118 can be integrated into the mobile device. A touch-sensitive wakeup area 120 can be used for simultaneously activating the mobile device through recovery from a sleep mode and unlocking the touch screen display 110 in response to human touch. The touch-sensitive wakeup area can be a separate push button, as shown, including a capacitive sensor. The push button can close a switch through physical depression allowing current to flow. The capacitive sensor can be used for determining whether the touch is from a human. The combination of the push button and capacitive sensor ensure that a person is attempting to activate and unlock the mobile device. Although the push button is shown flush with a front surface of the mobile device, it can be recessed into the front surface such that there is a bowl-like depression in the front face to further protect against accidental depression. In other embodiments, the touch-sensitive wakeup area can be only a capacitive sensor without the push button capability.

If further assurance is desired, the proximity sensors 116, 118 can be used to determine whether the mobile device is in a closed area, such as a pocket or handbag, and, if so, ignore any activation received through the touch-sensitive wakeup area 120. Additionally, the touch-sensitive wakeup area can include a fingerprint reader and any activation can be ignored without a fingerprint matching identification. As further described below, although the touch-sensitive wakeup area 120 is shown as a separate area from the touch screen display, it can be integrated into the display.

Figure 2:
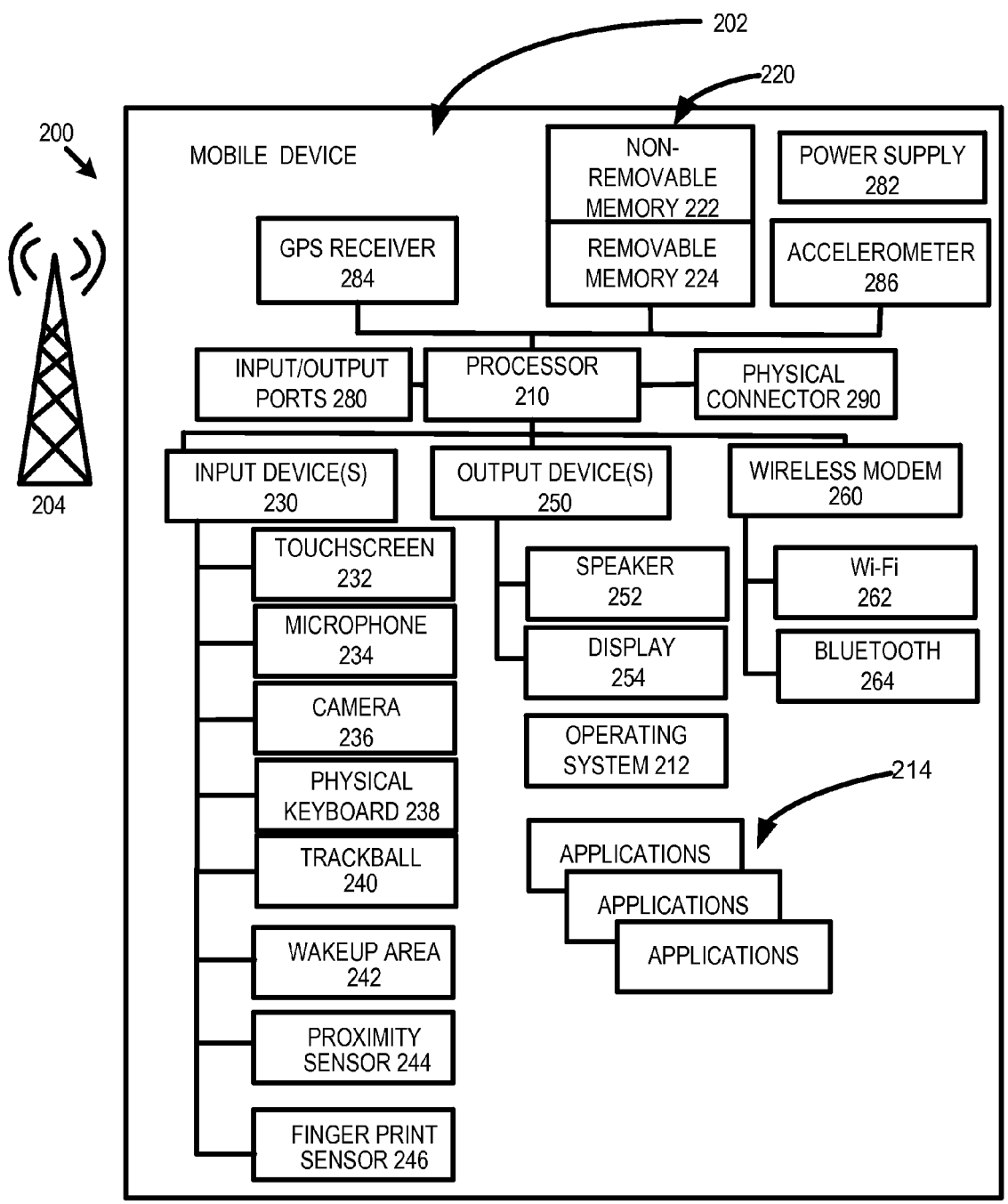
FIG. 2 is an example hardware diagram including components that can be used in the mobile device of FIG. 1.

FIG. 2 is a system diagram depicting an exemplary mobile device 200 including a variety of optional hardware and software components, shown generally at 202. Any components 202 in the mobile device can communicate with any other component, although not all connections are shown, for ease of illustration. The mobile device can be any of a variety of computing devices (e.g., cell phone, smartphone, handheld computer, Personal Digital Assistant (PDA), etc.) and can allow wireless two-way communications with one or more mobile communications networks 204, such as a cellular or satellite network.

The illustrated mobile device 200 can include a controller or processor 210 (e.g., signal processor, microprocessor, ASIC, or other control and processing logic circuitry) for performing such tasks as signal coding, data processing, input/output processing, power control, and/or other functions. An operating system 212 can control the allocation and usage of the components 202 and support for one or more application programs 214. The application programs can include common mobile computing applications (e.g., email applications, calendars, contact managers, web browsers, messaging applications), or any other computing application.

The illustrated mobile device 200 can include memory 220. Memory 220 can include non-removable memory 222 and/or removable memory 224. The non-removable memory 222 can include RAM, ROM, flash memory, a hard disk, or other well-known memory storage technologies. The removable memory 224 can include flash memory or a Subscriber Identity Module (SIM) card, which is well known in GSM communication systems, or other well-known memory storage technologies, such as "smart cards." The memory 220 can be used for storing data and/or code for running the operating system 212 and the applications 214. Example data can include web pages, text, images, sound files, video data, or other data sets to be sent to and/or received from one or more network servers or other devices via one or more wired or wireless networks. The memory 220 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

The mobile device 200 can support one or more input devices 230, such as a touch screen 232, microphone 234, camera 236, physical keyboard 238 and/or trackball 240. Additionally, the mobile device 200 can include a wakeup area 242, a proximity sensor 244, and a fingerprint sensor 246. The fingerprint sensor 246 can also be integrated into the wakeup area 242. The mobile device can also include one or more output devices 250, such as a speaker 252 and a display 254. Other possible output devices (not shown) can include piezoelectric or other haptic output devices. Some devices can serve more than one input/output function. For example, touchscreen 232 and display 254 can be combined in a single input/output device.

A wireless modem 260 can be coupled to an antenna (not shown) and can support two-way communications between the processor 210 and external devices, as is well understood in the art. The modem 260 is shown generically and can include a cellular modem for communicating with the mobile communication network 204 and/or other radio-based modems (e.g., Bluetooth or Wi-Fi). The wireless modem 260 is typically configured for communication with one or more cellular networks, such as a GSM network for data and voice communications within a single cellular network, between cellular networks, or between the mobile device and a public switched telephone network (PSTN).

The mobile device can further include at least one input/output port 280, a power supply 282, a satellite navigation system receiver 284, such as a Global Positioning System (GPS) receiver, an accelerometer 286, and/or a physical connector 290, which can be a USB port, IEEE 1394 (FireWire) port, and/or RS-232 port. The illustrated components 202 are not required or all-inclusive, as any components can deleted and other components can be added.

Figure 3:
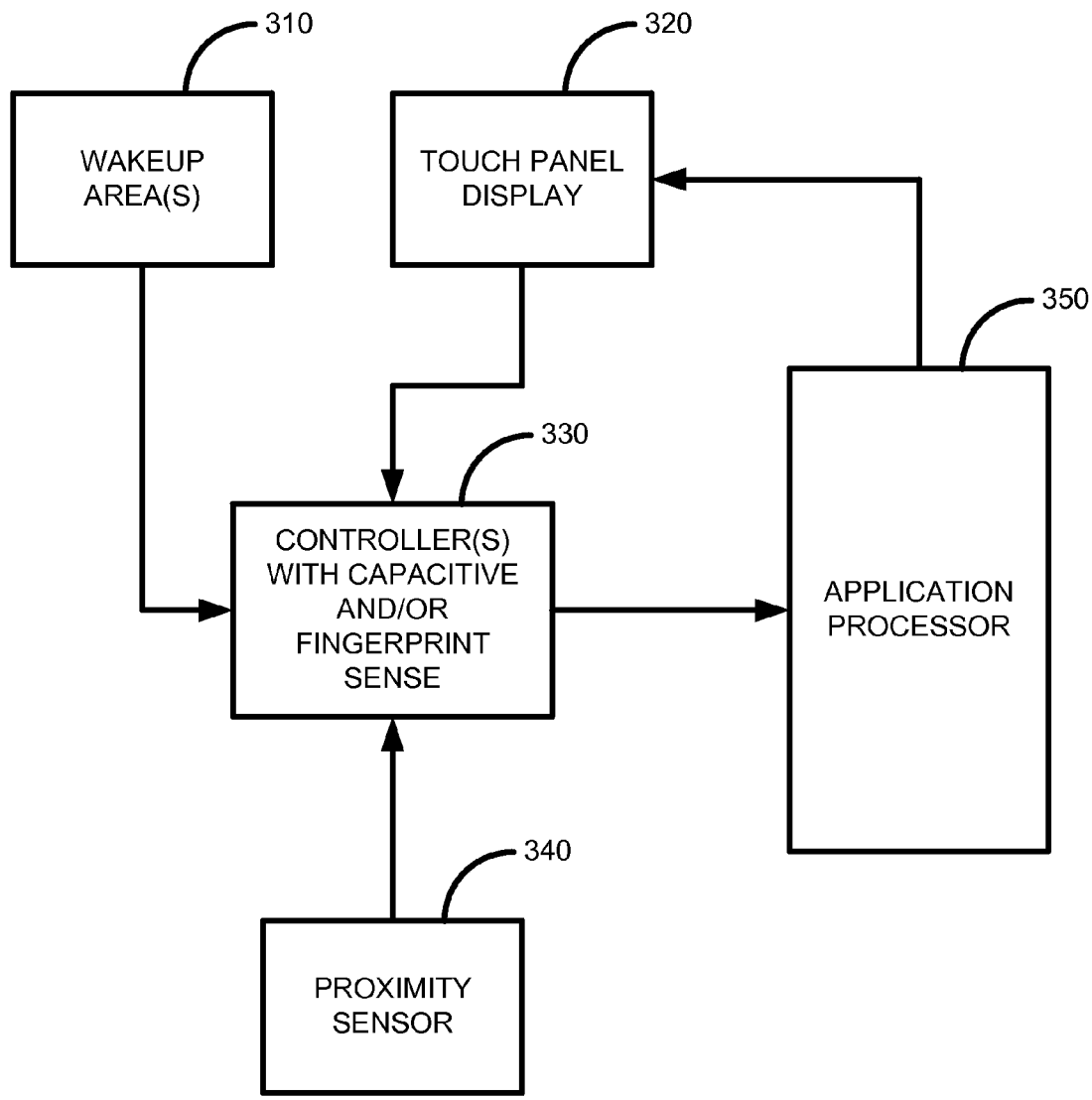
FIG. 3 is an example diagram showing additional hardware components associated with touch-based aspects of the mobile device.

FIG. 3 shows an example hardware diagram of components within a mobile device for simultaneous activation and unlocking. The wakeup area 310 is shown separate from a touch panel display 320 (also called a touch screen), but the two can be integrated together. Both the touch panel display and the wakeup area are coupled to a controller 330, which has the capability of detecting capacitive input through measuring of a voltage level received from the wakeup area 310. Although only one controller is shown, there can be more than one controller. For example, the wakeup area and touch panel display can be coupled to separate controllers. The controller 330 can also sense a fingerprint and compare the fingerprint to a stored fingerprint for identification. Such fingerprint sensors are known, such as disclosed in U.S. Patent Publications 2010/0220900 and 2010/0215224. Any available fingerprint sensors can be used. A proximity sensor 340 can also be coupled to the controller 330. Proximity sensors are also well known in the art, such as disclosed in U.S. Patent Publication 2010/0225332. Once the controller determines that the necessary prerequisites are satisfied for activating (i.e., recovering from a sleep mode) and unlocking the device, a message is sent to an application processor 350, which activates the touch panel display by illuminating the display and enabling touch sensors associated with the touch panel display.

Figure 4:
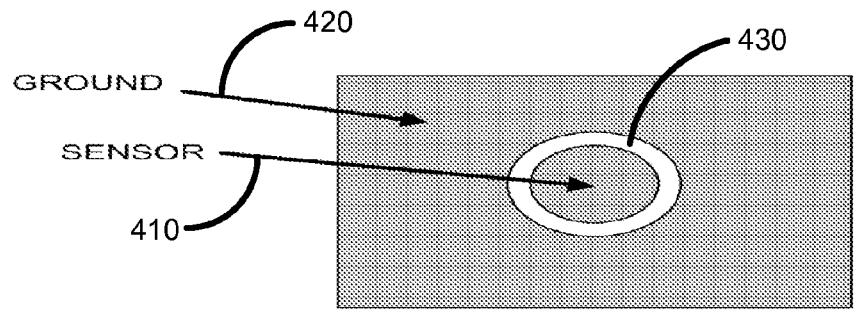
FIG. 4 is an example touch sensor and associated circuit.
Figure 4:
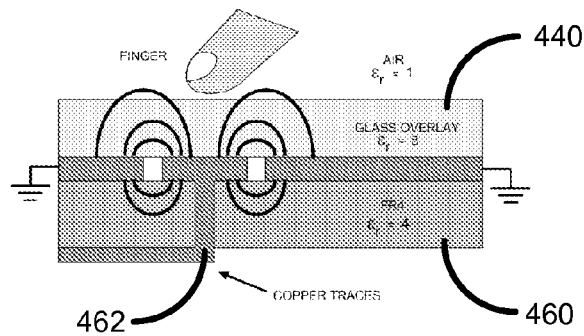
Figure 4:
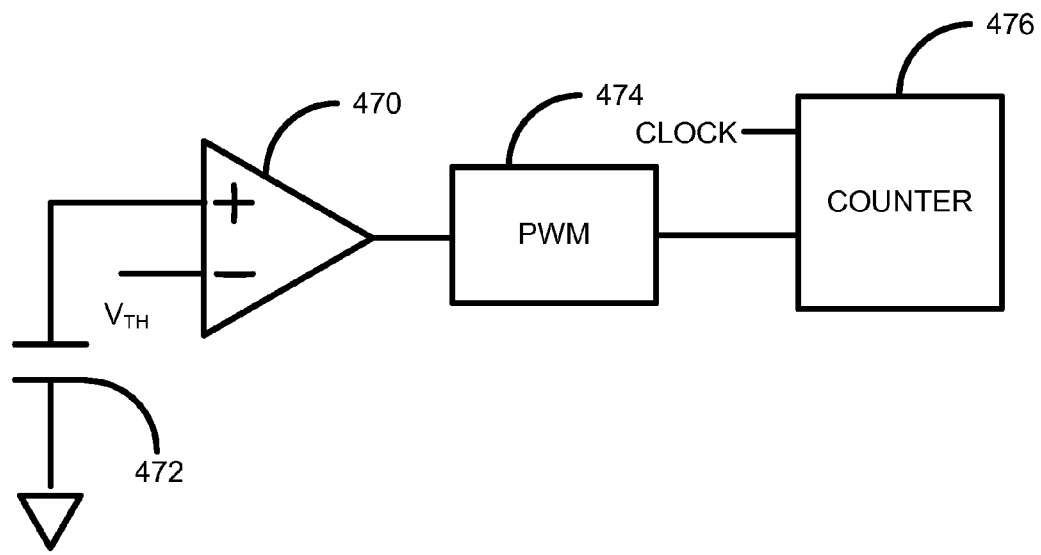

FIG. 4 shows an example touch sensor that can be used. A capacitive-based touch sensor can use a set of conductors that interact with electric fields. The human body includes conductive electrolytes covered by a skin layer, which is a dielectric. Such properties of the human body make it ideal for touch sensors. Placing a finger near fringing electric fields adds conductive surface area to a capacitive system, known as finger capacitance.

The touch-sensitive wakeup area includes a sensor 410 isolated from a ground plane 420 by a gap 430. The gap size is set to direct fringing fields through a glass overlay 440. The glass layer has a dielectric constant of around 8, while composite material, such as printed circuit board 460 has a dielectric constant of around 4. Other types of material with different dielectric constants can be used instead. Electrical traces 462 in the printed circuit board carry the electrical signals associated with touching by the human finger. Multiple varieties of circuits can be used for capacitive sensing. For example, an analog comparator 470 can be coupled to the capacitive sensor 472 and provide a comparison to a fixed voltage, V threshold. In some examples, a programmable current source (not shown) can also be coupled to the capacitive input in a well-known manner. The output of comparator 470 can be coupled to a pulse width modulator 474, which gates a counter 476 coupled to a free-running clock input.

Figure 5:
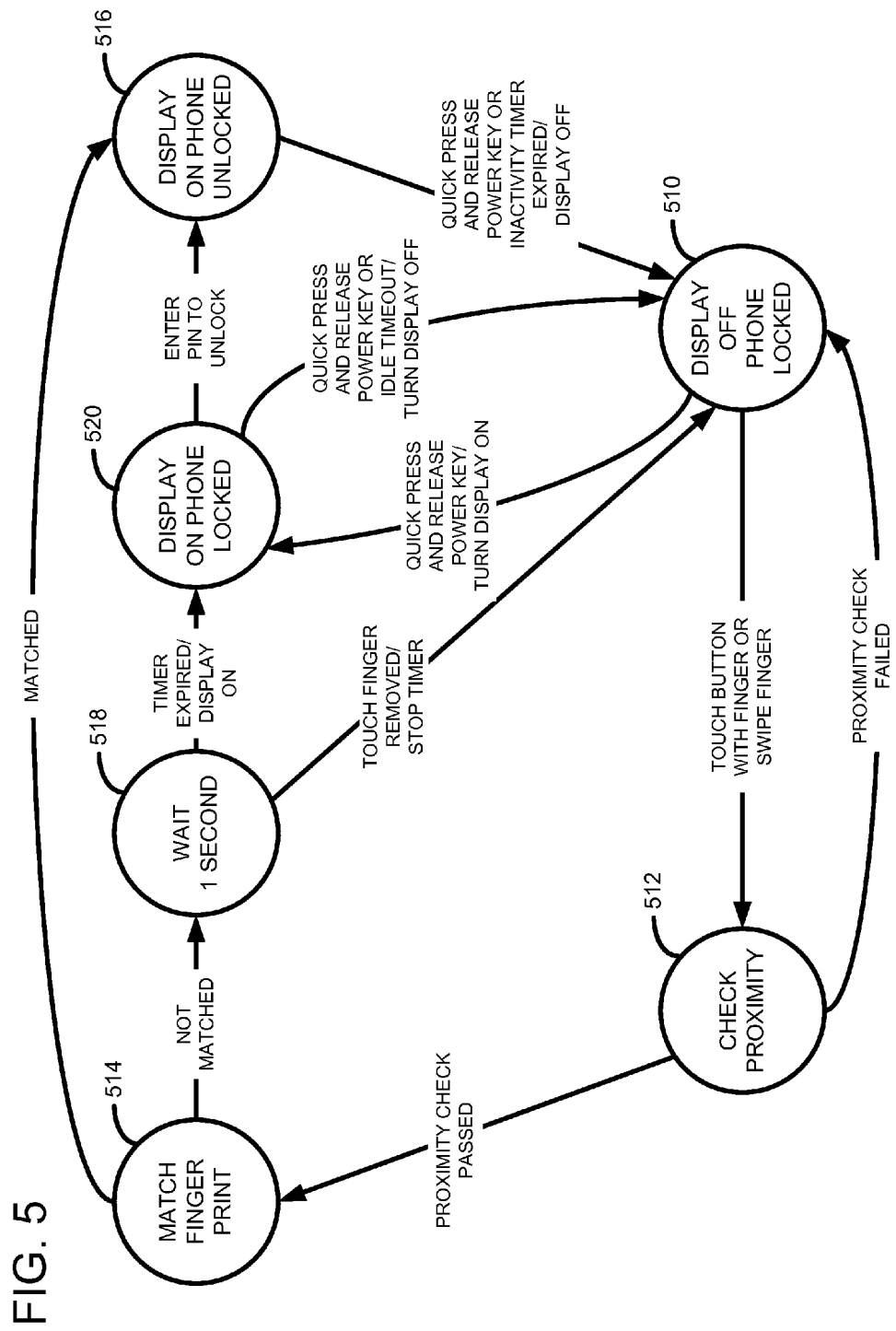
FIG. 5 is an example state machine that can be executed in an application processor of FIG. 3.

FIG. 5 shows an example state machine that can be used when finger print matching is desired. The state machine can be executed in the controller 330, the application processor 350 or a combination thereof. In state 510, the display is locked and in a sleep state. In the sleep state, the touch panel display is not illuminated and any sensor functionality is disabled. As a result, a low-power mode is achieved. When the wakeup area is sensed as having been touched by a human, a state transition is made to state 512, where a proximity check can be made using proximity detector 340. If the proximity check fails (objects are within predetermined distance of the proximity sensor), the state machine returns to state 510. If the proximity check passes, the state machine transitions to state 514 where a finger print match is performed. In this state, the controller 330 compares the scanned fingerprint received from the wakeup area and compares it to a stored fingerprint. If there is a match, then a state transition to state 516 is made wherein the touch panel display is activated and unlocked. If in state 514, a match is not made, then in state 518, a wait period for 1 second is made. If the user's finger is removed, a jump to state 510 is made and the display is deactivated and locked. Otherwise, the display is activated in state 520, but the mobile device remains locked. A correct pin code can then be entered to move from state 520 to state 516. Otherwise, a transition is made back to state 510 and the display is locked and deactivated.

Figure 6:
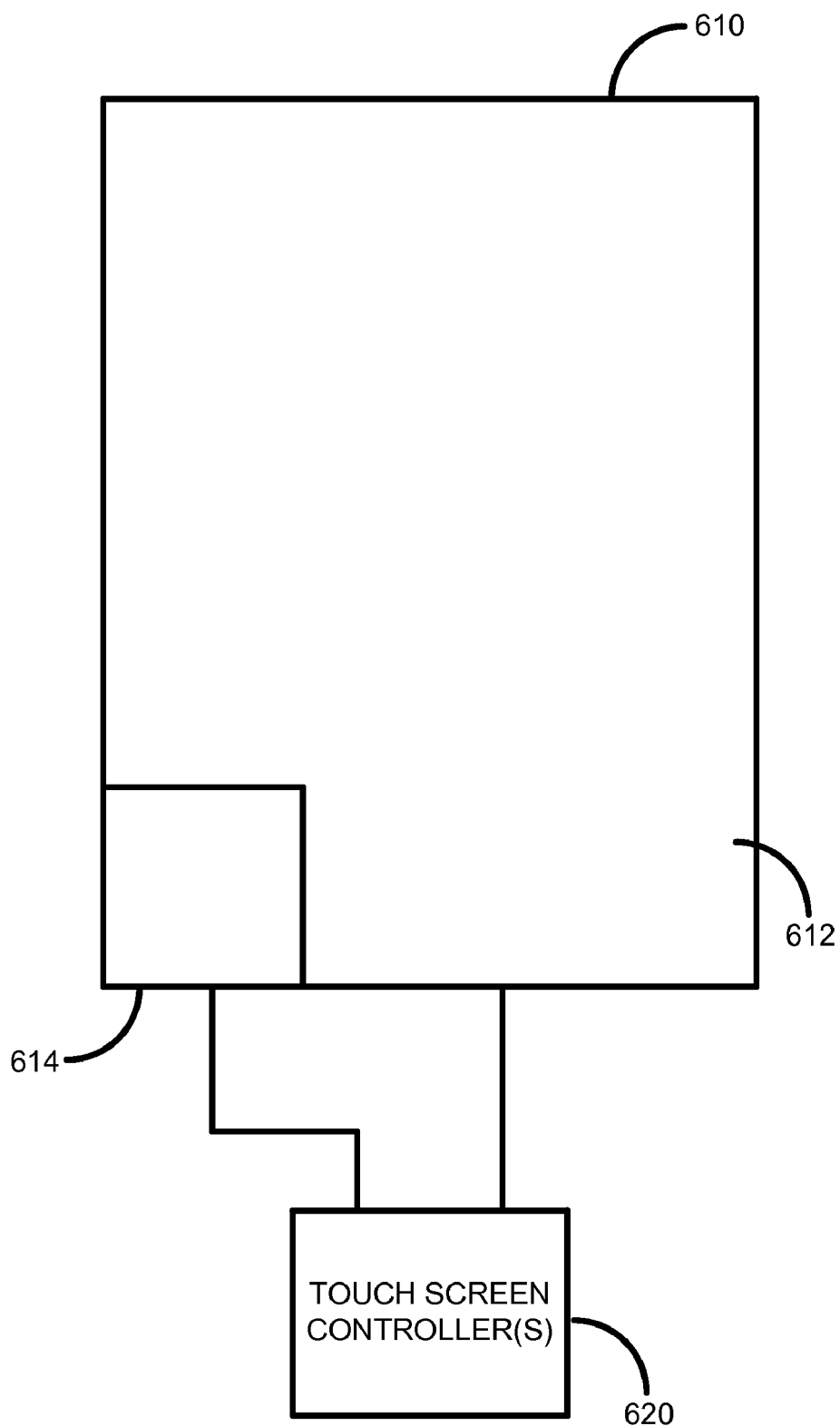
FIG. 6 is an example touch sensor integrated into a touch display.

FIG. 6 shows an example touch panel display screen 610. The touch panel display can be a variety of types, such as resistive, capacitive, surface acoustic wave system, etc. In any event, the touch panel display screen includes a main area 612 and a wakeup area 614. The main area 612 can be separately powered and controlled so that the main area can be deactivated while the wakeup area remains activated. Although a single wakeup area is shown, there can be multiple wakeup areas. Additionally, the wakeup area can include hardware for merely detecting whether a human touched anywhere in the wakeup area, while the main area 612 can include hardware for determining a location where the touch panel display was touched. As a result, the wakeup area can operate under lower power than the main area. One or more touch screen controllers 620 can be separately coupled to the wakeup area 614 and the main area 612 and can separately receive touch information. Both areas can operate independently in terms of commands received therefrom. However, the main area is at least four times greater in size than the wakeup area, and in many embodiments the ratio is much bigger. If additional power savings is desired, in any of the embodiments described herein, a sampling rate of the wakeup area can be further slowed when in low-power mode.

Figure 7:
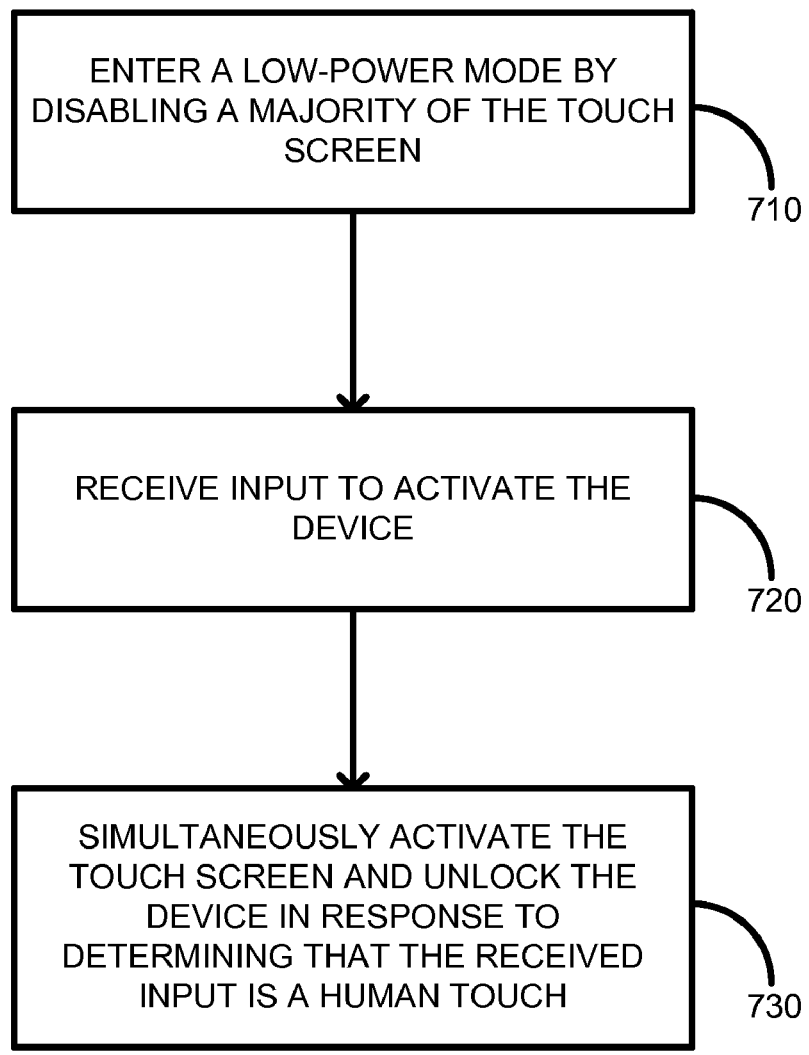
FIG. 7 is a flowchart of a method for simultaneous device activation and unlocking.

FIG. 7 is a flowchart of a method for simultaneously activating and unlocking a mobile device. In process block 710, a lower-power mode is entered by disabling a majority of the touch screen. For example, returning to FIG. 6, the main area 612 can be disabled or deactivated. While disabled, hardware for detecting a touch location is switched off so as to reduce power consumption. The main area, which is considered the majority of the touch screen, is substantially disabled, which means some minimal functionality can still exist. For example, without the touch panel being fully illuminated, a background message can appear, such as "low-power mode" or the like, just so the user knows the battery is not depleted. Meanwhile, a minority of the touch screen (wakeup area) or a separate button can remain activated. In process block 720, input is received to activate the device. Preferably, a determination is made whether the input is from a human touch. As previously described, a voltage comparison can be performed against a threshold voltage. Because the human body has a known voltage associated with it, a determination can be made whether the input was derived from a human touch. In process block 730, in response to the determination that the received input is from a human touch, the mobile device simultaneously activates the touch screen and unlocks the device. It should be recognized that "simultaneously" is as viewed from a human perspective, such that the two events occur close enough in time that to the average user they happen simultaneously. When the mobile device is activated, the touch panel display is illuminated and when it is unlocked, user commands are received and acted upon.

Figure 8:
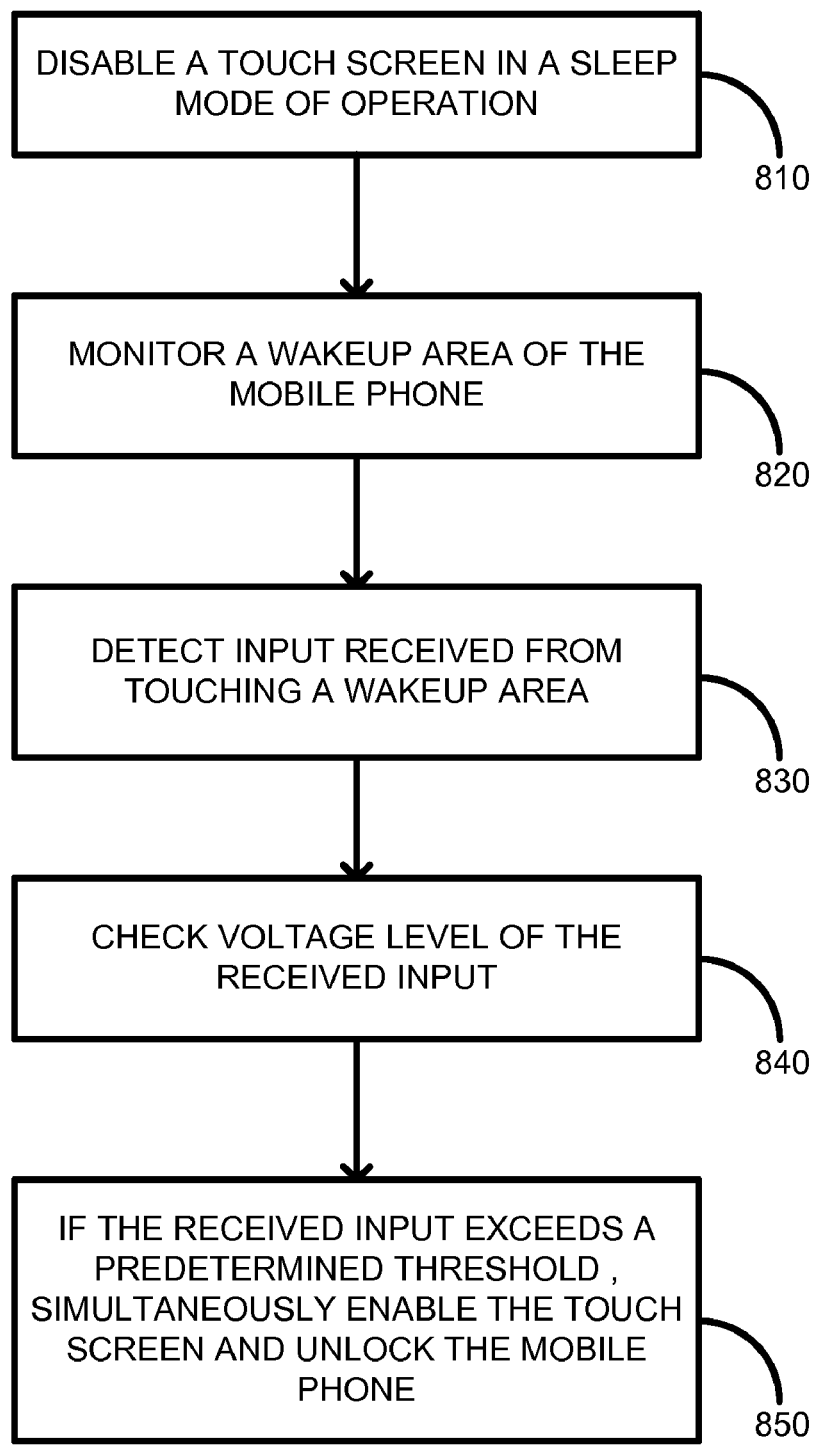
FIG. 8 is a detailed flowchart for simultaneous device activation and unlocking.

FIG. 8 is a flowchart of a method showing another embodiment that can be implemented on a mobile device, and, in this particular example, a mobile phone. In process block 810, a touch screen of the mobile phone is substantially disabled in a sleep mode of operation. When substantially disabled, the touch screen does not accept user commands when touched, although some indication can be displayed to indicate that the mobile phone is locked or in sleep mode. In process block 820, a wakeup area of the mobile phone is monitored even while the phone is in a sleep mode of operation. In process block 830, input is received in a wakeup area of the mobile phone. In particular, a capacitive sensor can be used to receive an input voltage. In process block 840, the received voltage level is compared to a predetermined voltage level. In process block 850, if the received input exceeds the predetermined threshold (indicating human touch), then the mobile phone is simultaneously activated and unlocked.

Figure 9:
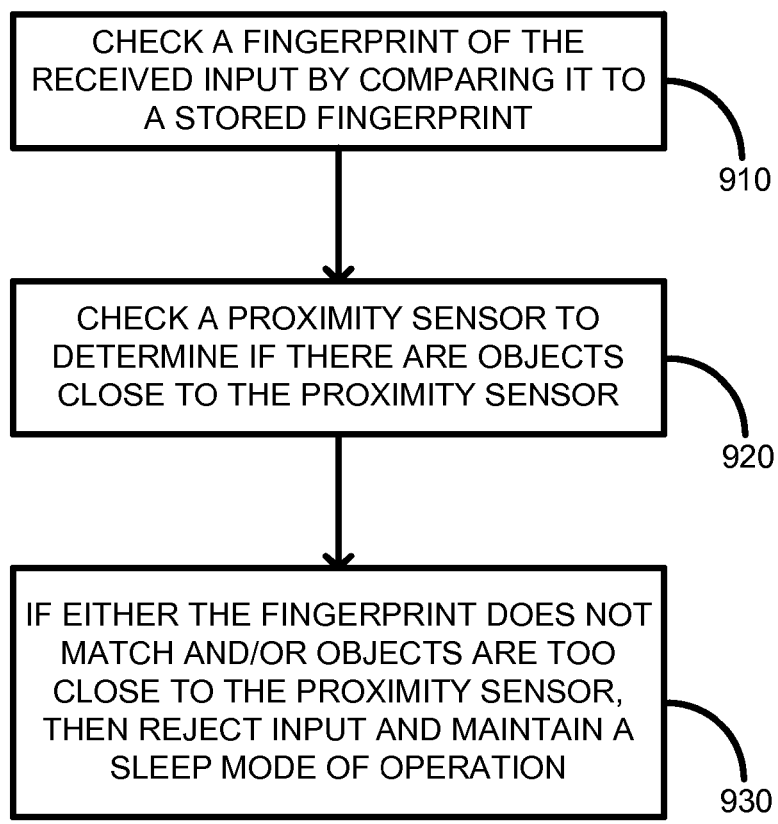
FIG. 9 shows a flowchart of additional features that can be used in the mobile device.

FIG. 9 is a flowchart of a method showing other features that can be added to the mobile device. In process block 910, a fingerprint recognition module can be incorporated into the wakeup area. The fingerprint recognition module receives a fingerprint input and the received fingerprint can either be compared to a stored fingerprint for identification matching or it can be checked for consistency with human fingerprints generally. Thus, the fingerprint recognition can be used to ensure human touch generally or a particular individual is touching the phone. In process block 920, a proximity sensor can be checked to determine if objects are within a close distance. For example, if the mobile device is in a handbag or a pocket, objects will be in very close proximity indicating that the mobile device was unintentionally activated. In process block 930, if either the fingerprint does not match and/or the objects are too close to the proximity sensor, then any input received from a touch screen is rejected or ignored and a sleep mode of operation is maintained.

Figure 10:
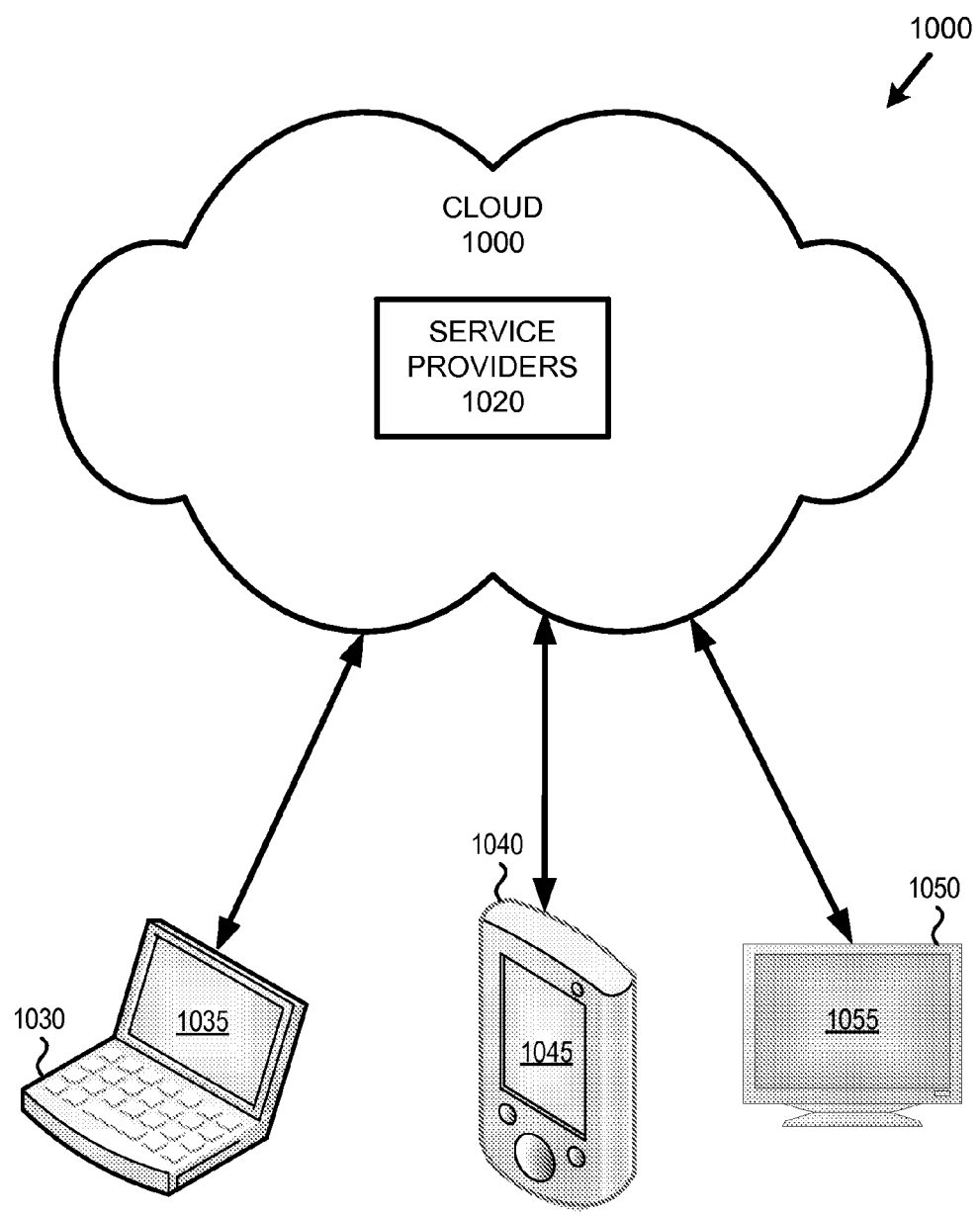
FIG. 10 shows different devices in which the present disclosure can be used.

FIG. 10 illustrates a generalized example of a suitable implementation environment 1000 in which described embodiments, techniques, and technologies may be implemented.

In example environment 1000, various types of services (e.g., computing services) are provided by a cloud 1010. For example, the cloud 1010 can comprise a collection of computing devices 1030, 1040, 1050, which may be located centrally or distributed, that provide cloud-based services to various types of users and devices connected via a network such as the Internet. The implementation environment 1000 can be used in different ways to accomplish computing tasks. For example, some tasks (e.g., processing user input and presenting a user interface) can be performed on local computing devices (e.g., connected devices 1030-1032) while other tasks (e.g., storage of data to be used in subsequent processing) can be performed in the cloud 1010.

In example environment 1000, the cloud 1010 provides services for connected devices 1030, 1040 1050 with a variety of screen capabilities. Connected device 1030 represents a device with a computer screen 1035 (e.g., a mid-size screen). For example, connected device 1030 could be a personal computer such as desktop computer, laptop, notebook, netbook, or the like. Connected device 1040 represents a device with a mobile device screen 1045 (e.g., a small size screen). For example, connected device 1040 could be a mobile phone, smart phone, personal digital assistant, tablet computer, and the like. Connected device 1050 represents a device with a large screen 1055. For example, connected device 1050 could be a television screen (e.g., a smart television) or another device connected to a television (e.g., a set-top box or gaming console) or the like. One or more of the connected devices 1030, 1040, 1050 can include touch screen capabilities. Touchscreens can accept input in different ways. For example, capacitive touchscreens detect touch input when an object (e.g., a fingertip or stylus) distorts or interrupts an electrical current running across the surface. As another example, touchscreens can use optical sensors to detect touch input when beams from the optical sensors are interrupted. In any event, the touch screens can incorporate any of the simultaneous activation and unlocking features described herein. Physical contact with the surface of the screen is not necessary for input to be detected by some touchscreens. Devices without screen capabilities also can be used in example environment 1000. For example, the cloud 1010 can provide services for one or more computers (e.g., server computers) without displays.

Services can be provided by the cloud 1010 through service providers 1020, or through other providers of online services (not depicted). For example, cloud services can be customized to the screen size, display capability, and/or touch screen capability of a particular connected device (e.g., connected devices 1030, 1040, 1050).

In example environment 1000, the cloud 1010 provides the technologies and solutions described herein to the various connected devices 1030-1032 using, at least in part, the service providers 1020. For example, the service providers 1020 can provide a centralized solution for various cloud-based services. The service providers 1020 can manage service subscriptions for users and/or devices (e.g., for the connected devices 1030, 1040, 1050 and/or their respective users).

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., non-transitory computer-readable media, such as one or more optical media discs, volatile memory components (such as DRAM or SRAM), or nonvolatile memory components (such as hard drives)) and executed on a computer (e.g., any commercially available computer, including smart phones or other mobile devices that include computing hardware). Any of the computer-executable instructions for implementing the disclosed techniques as well as any data created and used during implementation of the disclosed embodiments can be stored on one or more computer-readable media (e.g., non-transitory computer-readable media). The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A method of activating a device from a low-power mode, comprising:
    entering a low-power mode on the device, wherein a majority of a touch screen on the device is substantially disabled;
    receiving an input to activate the device;
    determining whether the input is from human touch;
    if the input is from human touch, activating the device and simultaneously unlocking the device, wherein the input to activate the device is received on a push button that closes a switch through physical depression and wherein the push button further includes a capacitive sensor for the determining whether the input is from human touch.

2. The method of claim 1, further including checking a fingerprint of the received input and if the fingerprint matches a stored fingerprint, then unlocking the device.

3. The method of claim 1, further including checking a proximity sensor and ignoring the received input if an object is within a predetermined distance of the proximity sensor.

4. The method of claim 1, wherein the device is a mobile phone.

5. The method of claim 1, wherein the input to activate the device is received on a push button that is separate from the touch screen.

6. The method of claim 1, wherein a minority of the touch screen remains activated in low-power mode in order to receive the input.

7. A device, comprising:
    a touch screen display;
    a touch-sensitive wakeup area;
    a controller coupled to the wakeup area for determining whether a human touched the wakeup area;
    an application processor coupled to the controller for recovering from sleep mode and simultaneously unlocking the touch screen display in response to a human touch of the wakeup area, wherein the wakeup area is a separate push button including a capacitive sensor.

8. The device of claim 7, further including a proximity sensor coupled to the controller for detecting whether the device is in a confined space.

9. The device of claim 7, wherein the wakeup area includes a fingerprint reader.

10. The device of claim 7, wherein the wakeup area is coupled to a capacitor, which is coupled to a voltage comparitor for determining whether a human touched the wakeup area.

11. The device of claim 7, wherein the touch-sensitive wakeup area is a separate area than the touch screen display.

12. The device of claim 7, wherein the touch-sensitive wakeup area is integrated into the touch screen display, but can be separately controlled when the device is in a sleep mode.

13. The device of claim 7, wherein the wakeup area does not include hardware for determining touch location.

14. The device of claim 13, wherein a controller separately controls the wakeup area and touch screen area so that the wakeup area can be monitored for touch while the touch screen area is deactivated.

15. A method of activating and unlocking a mobile phone, comprising:
- disabling a touch screen area of the mobile phone when the mobile phone is in a sleep mode of operation;
- monitoring a wakeup area of the mobile phone;
- detecting input received from a touching of the wakeup area, the input including a voltage received from a capacitor and a push button depression;
- determining if the input received is from a human touch by checking whether the voltage exceeds a predetermined voltage;
- if the input received is not from a human touch, ignoring the input; and
- if the input received is from a human touch, simultaneously enabling the touch screen area and unlocking the mobile phone.

16. The method of claim 15, further including reading a fingerprint from the touching of the wakeup area and rejecting the input received if the fingerprint does not match a saved fingerprint.

17. The method of claim 15, further including detecting whether the mobile phone is within an enclosed area using a proximity sensor and ignoring the input received if the proximity sensor detects objects less than a predetermined distance from the proximity sensor.

18. The method of claim 15, wherein the wakeup area is a first wakeup area and wherein there are one or more additional wakeup areas.

* * * * *